United States Patent
Chung et al.

(10) Patent No.: US 10,742,563 B2
(45) Date of Patent: Aug. 11, 2020

(54) METHOD OF CONGESTION CONTROL IN INFORMATION CENTRIC NETWORK BASED ENVIRONMENT WITH DELAY TOLERANT NETWORKING AND RECORDING MEDIUM AND DEVICE FOR PERFORMING THE SAME

(71) Applicant: Foundation of Soongsil University-Industry Cooperation, Seoul (KR)

(72) Inventors: Yun Won Chung, Seoul (KR); Dong Yeong Seo, Yongin-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 27 days.

(21) Appl. No.: 16/176,965

(22) Filed: Oct. 31, 2018

(65) Prior Publication Data

US 2020/0053014 A1    Feb. 13, 2020

(30) Foreign Application Priority Data

Aug. 9, 2018   (KR) .................. 10-2018-0092853
Aug. 30, 2018  (KR) .................. 10-2018-0102606

(51) Int. Cl.
*H04L 12/841* (2013.01)
*H04L 12/721* (2013.01)
(Continued)

(52) U.S. Cl.
CPC ............ *H04L 47/283* (2013.01); *H04L 45/20* (2013.01); *H04L 45/32* (2013.01); *H04L 47/115* (2013.01); *H04L 47/286* (2013.01); *H04L 47/32* (2013.01)

(58) Field of Classification Search
CPC ......... H04L 45/32; H04L 45/02; H04L 45/28; H04L 45/00; H04L 45/48; H04L 67/10;
(Continued)

(56) References Cited

U.S. PATENT DOCUMENTS 9,338,179 B2 *   5/2016  Wijbrans ................ H04L 51/12
2014/0059247 A1 * 2/2014  Vachharajani .......... H04L 47/24
                                                            709/234

(Continued)

FOREIGN PATENT DOCUMENTS

KR        10-1147467 B1     5/2012
KR      10-2014-0066066 A   5/2014
(Continued)

*Primary Examiner* — Djenane M Bayard
(74) *Attorney, Agent, or Firm* — Novick, Kim & Lee, PLLC; Sang Ho Lee

(57) ABSTRACT

Provided is a congestion control method for controlling message flooding between nodes in response to situation information in information centric network environment with delay tolerant networking, and a recording medium and a device for performing the same. The congestion control method includes, when a first node contacts a second node, exchanging information associated with stored messages with the second node, identifying whether an anti-flag is stored in the first node, the anti-flag being assigned when each message arrives at a destination node, flooding of a non-anti-flagged message among the messages stored in the first node to the second node, and flooding of an anti-flagged message among the messages stored in the first node to the second node according to at least one of situation information including a hop count, a Time-To-Live (TTL) and a number of requester nodes of the corresponding message and a mobility of the first node, or restricting the flooding to the second node.

13 Claims, 13 Drawing Sheets

(51) Int. Cl.
*H04L 12/823* (2013.01)
*H04L 12/733* (2013.01)
*H04L 12/801* (2013.01)

(58) Field of Classification Search
CPC ....... H04L 45/16; H04L 45/50; H04L 12/185; H04L 45/22; H04L 45/66; H04L 51/043; H04L 51/16; H04L 63/20; H04L 41/06; H04L 45/028; H04L 45/20; H04L 47/39; H04L 41/0659; H04L 45/04; H04L 67/327; H04L 67/2842; H04L 45/306; H04L 45/38; H04L 69/22; H04L 47/125; H04L 43/0876; H04L 45/745; H04L 47/283; H04L 61/1511; H04L 65/4084; H04L 45/74; H04L 45/7453; H04L 47/27; H04L 61/15; H04L 65/608; H04L 67/1097; H04L 67/322; H04L 45/72; H04L 45/748; H04L 47/12; H04L 47/32; H04L 69/16; H04L 45/741; H04L 45/742; H04L 45/7457; H04L 61/103; H04L 61/1582; H04L 61/2007; H04L 61/2503; H04L 61/256; H04L 65/602; H04L 67/1008; H04L 67/32; H04L 69/02; H04L 12/2803; H04L 2209/38; H04L 2212/00; H04L 29/06163; H04L 29/06517; H04L 29/08045; H04L 43/0852; H04L 43/0864; H04L 45/122; H04L 45/34; H04L 45/70; H04L 61/251; H04L 61/304; H04L 61/35; H04L 61/6059; H04L 61/6063; H04L 63/1416

See application file for complete search history.

(56) References Cited

U.S. PATENT DOCUMENTS

| | | | |
|---|---|---|---|
| 2015/0222479 A1 | 8/2015 | Kim et al. | |
| 2017/0318453 A1* | 11/2017 | Raghu | H04W 4/80 |
| 2019/0149460 A1* | 5/2019 | Andrews | H04L 45/32 |
| | | | 370/390 |

FOREIGN PATENT DOCUMENTS

| | | |
|---|---|---|
| KR | 10-2015-0091880 A | 8/2015 |
| KR | 10-1546759 B1 | 8/2015 |
| KR | 10-2017-0125235 A | 11/2017 |

* cited by examiner

| $R_A$ PAID Table | | |
|---|---|---|
| Data_id | Req | Anti |
| d_1 | $C_1, C_2$ | IMM |
| d_2 | $C_3$ | IMM |
| d_3 | $C_4$ | - |
| d_4 | $C_5$ | IMM |
| d_5 | $C_3$ | - |

| $R_B$ PAID Table | | |
|---|---|---|
| Data_id | Req | Anti |
| d_1 | $C_2$ | IMM |
| d_3 | $C_3, C_4$ | IMM |
| d_4 | $C_5$ | - |
| d_5 | $C_1$ | IMM |

| Interest list of $R_A$ | | |
|---|---|---|
| ID | Data ID | Requester |
| i_1 | d_1 | $C_1, C_2$ |
| i_2 | d_2 | $C_3$ |
| i_4 | d_3 | $C_4,(C_3)$ |
| i_6 | d_4 | $C_5$ |
| i_8 | d_5 | $C_3,(C_1)$ |

| Interest list of $R_B$ | | |
|---|---|---|
| ID | Data ID | Requester |
| i_3 | d_1 | $C_2,(C_1)$ |
| i_5 | d_3 | $C_3, C_4$ |
| i_7 | d_4 | $C_5$ |
| i_9 | d_5 | $C_1, C_3$ |

FIG. 5

R_A PAID Table

| Data_id | Req | Anti | SC |
|---|---|---|---|
| d_1 | C₁, C₂ | VAC | C₂ |
| d_2 | C₃ | VAC | C₃ |
| d_3 | C₄, C₃ | +VAC | -- |
| d_4 | C₅ | VAC | -- |
| d_5 | C₃ | -- | -- |
| d_5 | C₁ | +VAC | -- |

R_B PAID Table

| Data_id | Req | Anti | SC |
|---|---|---|---|
| d_1 | C₂, C₁ | VAC | C₂ |
| d_3 | C₃, C₄ | VAC | -- |
| d_4 | C₅ | +VAC | -- |
| d_5 | C₁ | VAC | -- |
| d_2 | C₃ | +VAC | C₃ |

Interest list of R_A

| ID | Data ID | Requester |
|---|---|---|
| L1 | d_1 | C₁, ~~C~~ |
| ~~L2~~ | ~~d_2~~ | ~~C~~ |
| ~~L4~~ | ~~d_3~~ | ~~C~~ |
| L6 | d_4 | C₅ |
| L8 | d_5 | C₃ |

Interest list of R_B

| ID | Data ID | Requester |
|---|---|---|
| ~~L3~~ | ~~d_1~~ | ~~C~~ |
| L5 | d_3 | C₃, C₄ |
| ~~L7~~ | ~~d_4~~ | ~~C~~ |
| L9 | d_5 | C₁ |

FIG. 8

METHOD OF CONGESTION CONTROL IN INFORMATION CENTRIC NETWORK BASED ENVIRONMENT WITH DELAY TOLERANT NETWORKING AND RECORDING MEDIUM AND DEVICE FOR PERFORMING THE SAME

CROSS-REFERENCE TO RELATED APPLICATIONS

This application claims priority under 35 U.S.C. § 119 to Korean Patent Application No. 10-2018-0092853, filed on Aug. 9, 2018, and Korean Patent Application No. 10-2018-0102606, filed on Aug. 30, 2018, in the Korean Intellectual Property Office, the disclosures of which are incorporated herein by reference in their entirety.

TECHNICAL FIELD

The present disclosure relates to a method of congestion control in information-centric network environment with delay-tolerant networking, and more particularly, to a congestion control method for controlling message flooding between nodes in response to situation information, and a recording medium and a device for performing the same.

BACKGROUND

Information Centric Networking (ICN) is a communication approach based on a data name rather than an IP address. Currently, there are rapid increases in Internet usage in terms of the number of users and data capacity. According to the current data transmission method based on IP address, transmission is carried out using a receiver's IP address related to the physical location, and accordingly the same data is repeatedly transmitted thorough the network. Therefore, the current data transmission method is inefficient.

ICN is technology proposed to overcome a traffic bottleneck phenomenon which is a disadvantage of the conventional IP address-based communication method, and the ICN enables routers or nodes to store and distribute specified data to neighboring routers or nodes that request the corresponding data. In ICN, a message may be classified into Interest and Data. A customer or data requester that needs Data can disseminate Interest through the network. When receiving the Interest, a router, node or data provider that has the requested Data may deliver the Data to the customer or data requester back through the same path from which the Interest is delivered.

ICN is designed based on a network environment where connectivity is guaranteed, and enables the flooding of Interest and Data packets based on the designed network information.

Delay Tolerant Networking (DTN) is an approach designed to deliver a message between neighboring nodes in a store-carry-forward way in an environment where connectivity is not guaranteed between source node and a destination node. In DTN, each node stores a message to transmit, and can forward the message to another node according to a preset condition when it encounters another node.

DTN attracts a lot of attention because it can overcome disconnection through opportunistic transmission between encountered neighboring nodes in an extreme environment where the communication infrastructure is destroyed by disasters, such as earthquakes, floods and fires, and there is no routing path that stably connects many nodes due to low node density.

However, when DTN is applied to ICN based environment, because network resources are limited, a large amount of duplicate data is unnecessarily generated, causing congestion in the overall network, and due to this reason, the probability of data desired by a requester, being delivered to destination, may be lowered.

SUMMARY

An aspect of the present disclosure provides a congestion control method that in combined network environment of information centric networking (ICN) and delay tolerant networking (DTN), records immunity information for a duplicate message, and using this, controls message flooding between nodes, and a recording medium and a device for performing the same.

Another aspect of the present disclosure provides a congestion control method for controlling message flooding between nodes in combined ICN and DTN network environment in consideration of situation information on the network, and a recording medium and a device for performing the same.

To achieve the above-described object, a congestion control method for controlling message flooding between nodes in response to situation information of an information centric network environment with delay tolerant networking, according to the present disclosure includes when a first node contacts a second node, exchanging information with the second node, identifying whether anti-flag is stored in message in the first node, wherein the anti-flag is assigned when each message arrives at a destination node; first flooding the messages in the first node which do not include the anti-flag to the second node, and second flooding the messages in the first node which include the anti-flag to the second node according to at least one of the following situation information including: a hop count, a Time-To-Live (TTL) a number of requester nodes of the corresponding message, and a mobility pattern of the first node, or restricting the second flooding to the second node.

the identifying whether the anti-flag is stored in the first node, the anti-flag being assigned when each message arrives at a destination node may include: identifying whether the anti-flag is stored in messages in the first node by using a Pending Anti Interest and Data (PAID) table having items of requester node, immunity and requester node having received data for each message stored in the first node.

Additionally, the step of identifying may include: storing the PAID table having items of requester node, immunity and requester node having received data for data of each message stored in the first node, upon arrival at the destination node that provides data of the messages stored in the first node, allocating anti-flag to an immunity item of the corresponding data in the PAID table, and after delivery of data of the messages stored in the first node to a requester node of the corresponding data, recording the requester node in the requester node item having received data of the corresponding data in the PAID table.

Additionally, the step of the second flooding may include:
  in the case of controlling the second flooding of the anti-flagged message among the messages stored in the first node to the second node according to the hop count of the corresponding message,
 classifying the corresponding message as an urgent message or a normal message, comparing the hop count of the anti-flagged message among the messages stored in the first node with a preset urgent message hop count threshold. $HU_{th}$ or normal message hop count threshold $HN_{th}$;

when the hop count of the anti-flagged message among the messages stored in the first node is less than the urgent message hop count threshold $HU_{th}$ or the normal message hop count threshold $HN_{th}$, the second flooding the corresponding message to the second node, and when the hop count of the anti-flagged message among the messages stored in the first node is equal to or greater than the urgent message hop count threshold $HU_{th}$ or the normal message hop count threshold $HN_{th}$, restricting the second flooding of the corresponding message to the second node.

Additionally, the step of the second flooding may include, in the case of controlling the second flooding of the anti-flagged message among the messages stored in the first node to the second node according to the TTL of the corresponding message, comparing the TTL of the corresponding message with a preset TTL threshold $TL_{th}$, when the TTL of the anti-flagged message among the messages stored in the first node is equal to or greater than the TTL threshold $TL_{th}$, flooding the corresponding message to the second node, and when the TTL of the anti-flagged message among the messages stored in the first node is less than the TTL threshold $TL_{th}$, restricting the flooding of the corresponding message to the second node.

Additionally, the step of the second flooding may include, in the case of controlling the second flooding of the anti-flagged message among the messages stored in the first node to the second node according to the number of requester nodes of the corresponding message, comparing the number of requester nodes of the corresponding message with a preset requester node number threshold $NR_{th}$, when the number of requester nodes of the anti-flagged message among the messages stored in the first node is equal to or greater than the requester node number threshold $NR_{th}$, flooding the corresponding message to the second node, and when the number of requester nodes of the anti-flagged message among the messages stored in the first node is less than the requester node number threshold $NR_{th}$, restricting the second flooding of the corresponding message to the second node.

Additionally, the step of second flooding may include, in the case of controlling the second flooding of the anti-flagged message among the messages stored in the first node to the second node according to the mobility pattern of the first node, classifying the first node as a special node that moves in a predefined path or a random node that moves in a random path, when the first node is classified as a random node, flooding the anti-flagged message among the messages stored in the first node to the second node, and when the first node is classified as a special node, restricting the second flooding of the anti-flagged message among the messages stored in the first node to the second node.

Additionally, the congestion control method may further include, in the case of restricting the second flooding of the anti-flagged message among the messages stored in the first node to the second node, updating information associated with messages stored in the second node using information of the anti-flagged message among the messages stored in the first node.

Additionally, the congestion control method may further include, in the case of restricting the second flooding of the anti-flagged message among the messages stored in the first node to the second node, updating a PAID table of the second node having items of requester node, immunity and requester node having received data for each data of each message stored in the second node using information of the anti-flagged message among the messages stored in the first node.

In addition, there is provided a computer-readable non-transitory recording medium having recorded thereon a computer program for performing a congestion control method, the congestion control method may include;

When a first node contacts a second node, exchanging information with the second node; identifying whether anti-flag is stored in messages in the first node, wherein the anti-flag is assigned when each message arrives at a destination node;

first flooding the messages in the first node which do not include the anti-flag to the second node; and second flooding the messages in the first node which include the anti-flag to the second node according to at least one of the following situation information including: a hop count, a Time-To-Live (TTL), a number of requester nodes of the corresponding message, and a mobility pattern of the first node, or restricting the second flooding to the second node.

In addition, a congestion control device for controlling message flooding between nodes in reply to situation information of an information centric network environment with delay tolerant networking according to the present disclosure includes a memory and a processor;

a message storage unit which stores a message list including messages to deliver to another node and information associated with the messages, a PAID table storage unit which stores a PAID table having a record of anti-flag for a message delivered to a destination node that provides data of the message among the messages stored in the message storage unit, and a message flooding unit which exchanges the message list with other node upon contact with another node, identifies the presence or absence of anti-flag of the messages included in the message list using the PAID table, floods a non-anti-flagged message among the messages included in the message list to other node, and floods an anti-flagged message among the messages included in the message list to other node according to at least one of situation information including a hop count, a TTL and a number of requester nodes of the corresponding message and a mobility pattern of a node, or restricts the flooding to other node.

According to the present disclosure, in combined ICN and DTN network environment, immunity information for a duplicate message is recorded, and using this, message flooding is controlled, thereby controlling the overall network overhead and improving the message delivery performance.

Additionally, flooding of a message is controlled according to the number of copies of the corresponding message based on the hop count of the corresponding message, thereby not only contributing to the efficient message delivery in DTN environment but also avoiding congestion caused by generation of too many duplicate messages.

Additionally, it is possible to prevent the unnecessary long-term circulation of the message by using the TTL of the message, and through this, efficiently store and manage the message in the storage space of nodes, thereby contributing to the improved network performance.

Additionally, by use of the number of requester nodes of the message, a message having multiple requester nodes is delivered with priority over a message having a single requester node, thereby improving the overall network message delivery ratio and the overhead ratio performance.

Additionally, with movement patterns of nodes, a special node that periodically moves in a specified path controls flooding of the duplicate message through the corresponding path, and a node having random mobility contributes to the message delivery according to different situation information, thereby reducing congestion caused by generation of unnecessary duplicate messages and improving the network performance.

BRIEF DESCRIPTION OF THE DRAWINGS

FIG. 5 is a diagram illustrating message delivery when IMMUNE scheme is applied to an anti-flooding unit shown in FIG. 4.

FIG. 8 is a diagram illustrating message delivery when Improved discarding scheme is applied to an anti-flooding unit shown in FIG. 4.

DETAILED DESCRIPTION OF EMBODIMENTS

Figure 1:
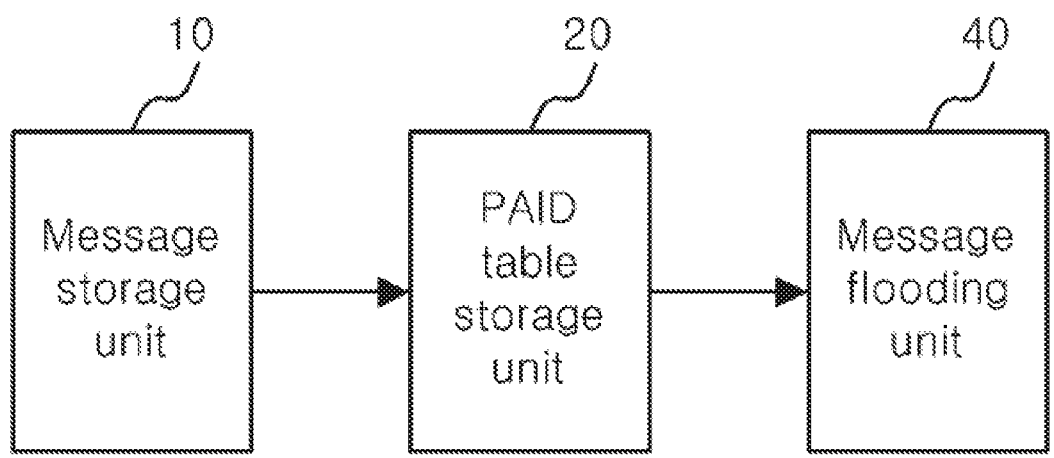
FIG. 1 is a block diagram of a congestion control device in information centric network environment with delay tolerant networking according to an embodiment of the present disclosure.

The following detailed description of the present disclosure is made with reference to the accompanying drawings, in which particular embodiments for practicing the present disclosure are shown for illustration purposes. These embodiments are described in sufficient detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made for locations or arrangements of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled.

In the drawings, similar reference signs denote same or similar functions in many aspects The term "Unit" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function.

Hereinafter, embodiments of the present disclosure will be described in more detail with reference to the accompanying drawings.

FIG. 1 is a block diagram of a congestion control device in information centric network environment with delay tolerant networking according to the embodiment of the present disclosure.

The congestion control device 1000 according to the embodiment of the present disclosure may be equipped in each node in a network environment to control message flooding between nodes in response to situation information.

In the present disclosure, the network environment may be an Information Centric Network (ICN) environment with Delay Tolerant Networking (DTN).

ICN is a networking approach based on data information such as the name of content or data rather than an IP address. In ICN, a message may be classified into Interest and Data. A data requester that needs Data can disseminate Interest through the network, and when receiving the Interest, a data provider that has the corresponding Data can deliver the Data to the data requester along the same path in reverse.

DTN is an approach designed to deliver a message between neighboring nodes in a store-carry-forward way in an environment where connectivity between a source node and a destination node is not guaranteed. In DTN, each node stores a message to transmit, and can forward the message to other nodes according to a preset condition when it encounters other nodes. A typical example of DTN is Epidemic protocol. In Epidemic protocol, stored messages are delivered to all contact nodes on the network, and the message delivery rate is high but a high traffic load is a disadvantage.

The congestion control device 1000 according to the embodiment of the present disclosure, in combined ICN and DTN network environment, records immunity information for a duplicate message, and using this, controls message flooding between nodes in response to situation information on the network, thereby controlling the overall network overhead and improving the message delivery performance.

Referring to FIG. 1, the congestion control device 1000 according to the embodiment of the present disclosure may include a message storage unit 10, a Pending Anti Interest and Data (PAID) table storage unit 20, and a message flooding unit 40.

The message storage unit 10 may have memory to store programs and data necessary for the operation of the congestion control device 1000 or data generated during the operation of the congestion control device 1000.

Additionally, the message storage unit 10 may store, in the memory, a message list including messages to transmit to other nodes and information associated with the stored messages. For example, the message list may be a list of Interest packets including data and its information of requester node. The message list may be exchanged upon contact with other nodes.

The PAID table storage unit 20 may construct and store a PAID table in which anti-flag representing immunity on the network is recorded for a message delivered to the destination node that provides data of the message among the messages stored in the message storage unit 10. Its description is made with reference to FIGS. 2 and 3.

Figure 2:
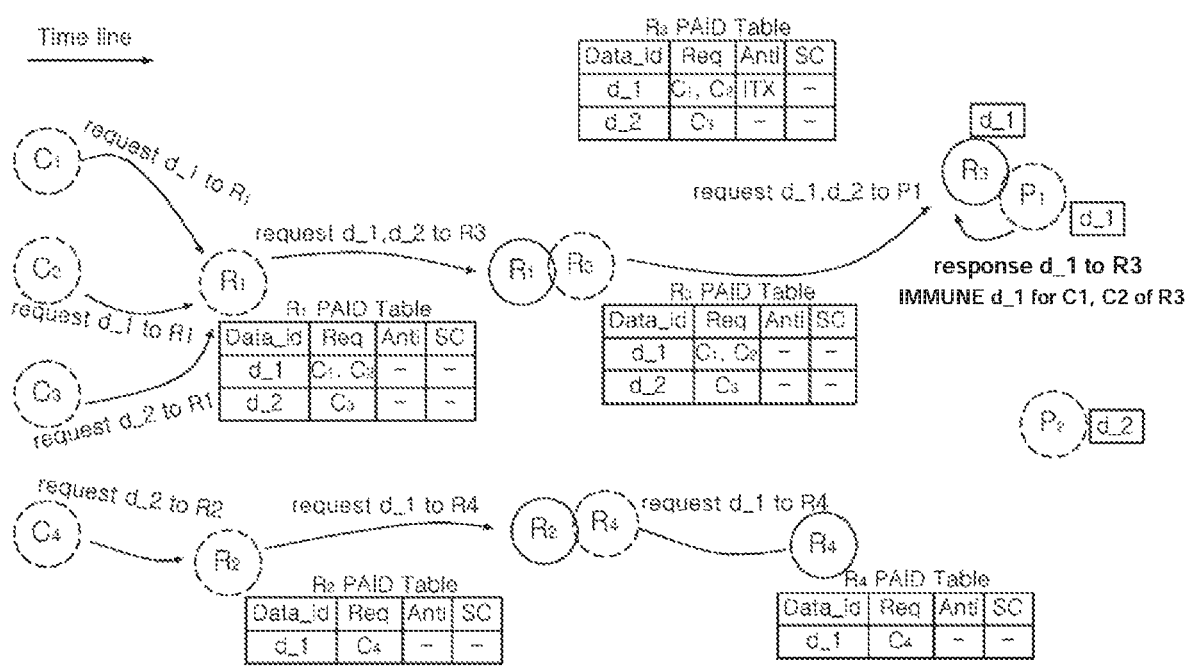
FIGS. 2 and 3 are diagrams showing changes in PAID table stored in a PAID table storage unit shown in FIG. 1 after contact between nodes.
Figure 3:
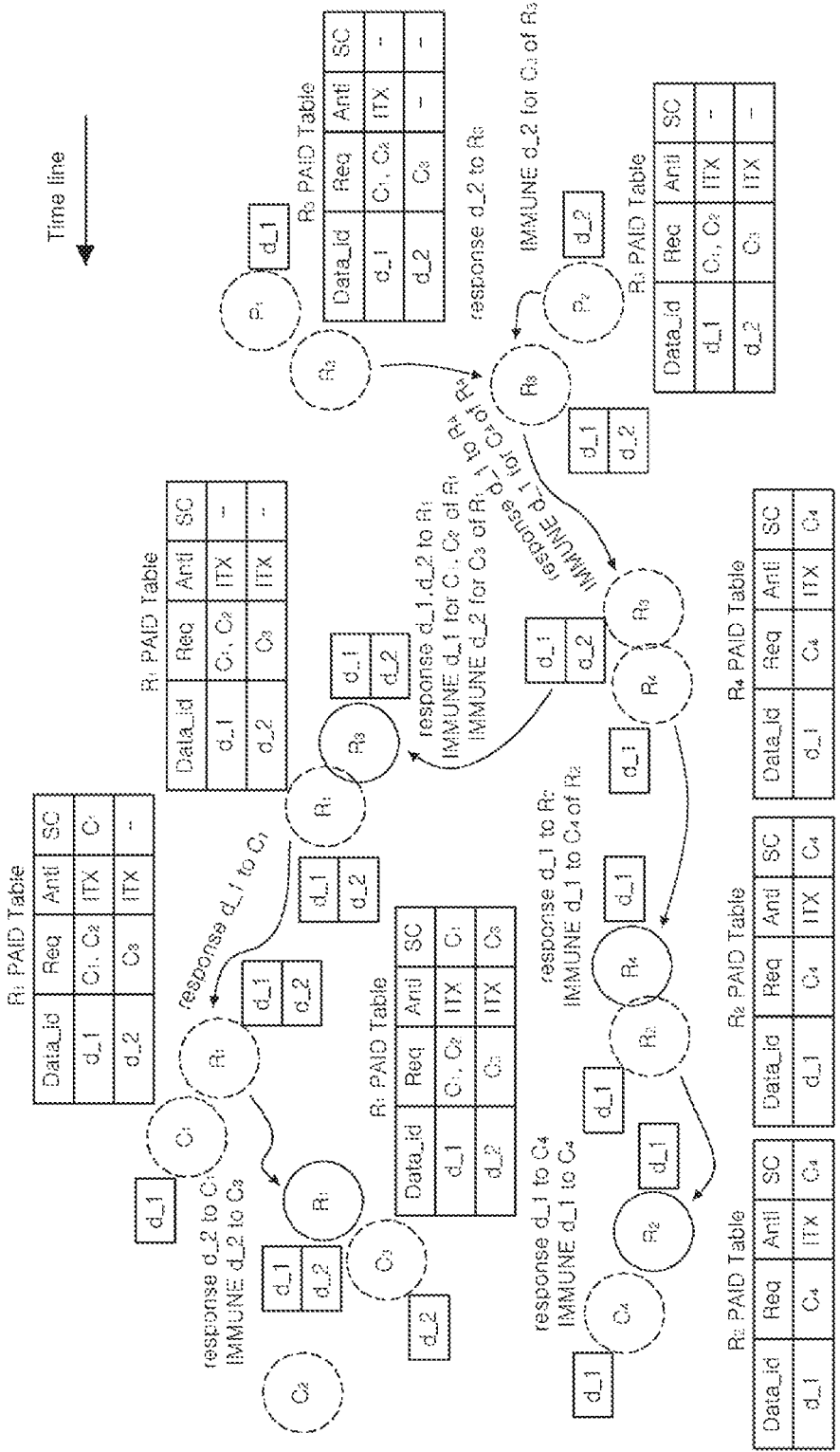

FIGS. 2 and 3 are diagrams showing changes in PAID table stored in the PAID table storage unit shown in FIG. 1 after contact between nodes.

Hereinafter, FIGS. 2 and 3 will be described by taking, as an example, the congestion control device 1000 according to the embodiment of the present disclosure shown in FIG. 1 being equipped in each node $R_1$, $R_2$, $R_3$, $R_4$, $C_1$, $C_2$, $C_3$, $C_4$, $P_1$, $P_2$ forming a network.

Additionally, although FIGS. 2 and 3 show nodes classified into mobile nodes $R_1$, $R_2$, $R_3$, $R_4$, requester nodes $C_1$, $C_2$, $C_3$, $C_4$ and destination nodes $P_1$, $P_2$ that provide data for convenience of description, the present disclosure is not limited thereto, and of course, a mobile node may be a data requester node or a destination node.

Referring to FIG. 2, a first requester node $C_1$ and a second requester node $C_2$ may request Data d_1, a third requester node $C_3$ may request Data d_2, and a message including Interest information may be flooded to a first mobile node $R_1$. Additionally, a fourth requester node $C_4$ may request Data d_1, and a message including Interest information may be flooded to a second mobile node $R_2$.

The first mobile node $R_1$ and the second mobile node $R_2$ may construct and store a PAID table for the message. The PAID table may be a table having items of requester node Req, immunity Anti for data and requester node SC having received data for each data of the message.

The first mobile node $R_1$ may move and contact a third mobile node $R_3$, and the third mobile node $R_3$ may receive the message from the first mobile node $R_1$ and construct a PAID table. The second mobile node $R_2$ may also move and contact a fourth mobile node $R_4$, and the fourth mobile node $R_4$ may receive the message from the second mobile node $R_2$ and construct a PAID table.

The third mobile node $R_3$ may move and arrive at a first destination node $P_1$ that provides Data d_1. The third mobile node $R_3$ may receive Data d_1 from the first destination node $P_1$, and allocate anti-flag ITX to the immunity Anti item of Data d_1 in the PAID table. The anti-flag may represent that the third mobile node $R_3$ is immune to Data d_1. That is, anti-flag may represent that the third mobile node $R_3$ has Data d_1. In FIG. 2, anti-flag is labeled with "ITX", which is a shorted form of one of the immunity schemes, IMMUNE_TX, and when IMMUNE immunity scheme is applied, it may be labeled with "IMM", and when VACCINE immunity scheme is applied, it may be labeled with "VAC".

Referring to FIG. 3, the third mobile node $R_3$ may move and arrive at a second destination node $P_2$ that provides Data d_2. The third mobile node $R_3$ may receive Data d_2 from the second destination node $P_2$, and allocate anti-flag ITX to the immunity Anti item of Data d_2 in the PAID table.

The third mobile node $R_3$ that is immune to Data d_1 and Data d_2 may move and contact the fourth mobile node $R_4$, and the fourth mobile node $R_4$ may contact the second mobile node $R_2$. The fourth mobile node $R_4$ and the second mobile node $R_2$ have Data d_1 and the message of the fourth requester node $C_4$ that requests it, and the fourth mobile node $R_4$ receives Data d_1 by the third mobile node $R_3$ and the second mobile node $R_2$ receives Data d_1 by the fourth mobile node $R_4$, and allocate anti-flag ITX to the immunity Anti item of Data d_1 in the PAID table.

The second mobile node $R_2$ that is immune to Data d_1 contacts the fourth requester node $C_4$, and may deliver Data d_1 to the fourth requester node $C_4$. When the second mobile node $R_2$ delivers Data d_1 to the fourth requester node $C_4$, the second mobile node $R_2$ may record the fourth requester node $C_4$ in the requester node SC item having received data of Data d_1 in the PAM table. In this process, the second mobile node $R_2$ is immune to Data d_1 and Interest message of the fourth requester node $C_4$ that requests it, and when it contacts another node that stores the same message, may discard the corresponding message.

After contact with the fourth mobile node $R_4$, the third mobile node $R_3$ may move again and contact the first mobile node $R_1$. The first mobile node $R_1$ has Data d_1 and the message of the first requester node $C_1$ and the second requester node $C_2$ that request it, and Data d_2 and the message of the third requester node $C_3$ that requests it. The first mobile node $R_1$ may receive Data d_1 and Data d_2 by the third mobile node $R_3$, and allocate anti-flag ITX to the immunity Anti item of Data d_1 and Data d_2 in the PAID table.

The first mobile node $R_1$ that is immune to Data d_1 and Data d_2 may deliver Data d_1 to the first requester node $C_1$ when it contacts the first requester node $C_1$, and may deliver Data d_2 to the third requester node $C_3$ when it contacts the third requester node $C_3$. When the first mobile node $R_1$ delivers Data d_1 to the first requester node $C_1$, the first mobile node $R_1$ may record the first requester node $C_1$ in the requester node SC item having received data of Data d_1 in the PAID table. In this process, the first mobile node $R_1$ is immune to Data d_1 and Interest message of the first requester node $C_1$ that requests it, and when it contacts another node that stores the same message, may discard the corresponding message. Likewise, when the first mobile node $R_1$ delivers Data d_2 to the third requester node $C_3$, the first mobile node $R_1$ may record the third requester node $C_3$ in the requester node SC item having received data of Data d_2 in the PAID table. In this process, the first mobile node $R_1$ is immune to Data d_2 and Interest message of the third requester node $C_3$ that requests it, and when it contacts another node that stores the same message, may discard the corresponding message.

As described above, the PAID table storage unit 20 may store a PAID table having items of requester node Req, immunity Anti for data and requester node SC having received data for each data of the message stored in the message storage unit 10. In the case of arriving at destination node that provides data of the message, the PAID table storage unit 20 may allocate anti-flag to the immunity Anti item of the corresponding data in the PAID table. Additionally, in the case of delivering data of the message to the requester node, the PAID table storage unit 20 may record the requester node in the requester node SC item having received data of the corresponding data in the PAID table.

Upon contact with another node, the message flooding unit 40 may exchange the message list with another node, and flood the message stored in the message storage unit 10 to another node. In this instance, the message flooding unit 40 may identify whether the anti-flag is stored in the message storage unit 10 using the PAID table, and in case of an anti-flag not being stored, the message flooding unit 40 may apply normal flooding mechanism in DTN, and in case of anti-flag being stored, apply normal flooding mechanism or anti-flooding mechanism, for example, IMMUNE, IMMUNE_TX, VAC and Improved discarding mechanism, in response to the situation information.

Figure 4:
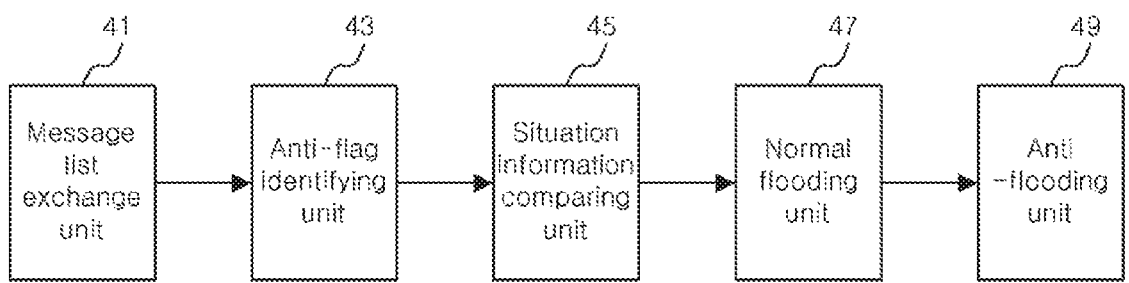
FIG. 4 is a block diagram of a message flooding unit shown in FIG. 1.

FIG. 4 is a block diagram of the message flooding unit shown in FIG. 1.

Referring to FIG. 4, the message flooding unit 40 may include a message list exchange unit 41, an anti-flag identifying unit 43, a situation information comparing unit 45, a normal flooding unit 47 and an anti-flooding unit 49.

The message list exchange unit 41 may exchange a message list with other node upon contact with another node. For example, the message list may be a list of Interest packets including data and its requester node information, and may include Interest identification ID number, data and its requester node.

The anti-flag identifying unit 43 may identify whether an anti-flag is stored in the message storage unit 10. The anti-flag identifying unit 43 may identify the presence or absence of anti-flag of the message stored in the message storage unit 10 using the PAID table. For example, the anti-flag identifying unit 43 may identify if an anti-flag is assigned to the immunity Anti item for data of the message stored in the message storage unit 10 from the PAID table.

The message identified as not anti-flagged by the anti-flag identifying unit 43 may be flooded to other node by the normal flooding unit 47.

The message identified to be anti-flagged by the anti-flag identifying unit 43 may be flooded to other node by the normal flooding 47 or may be flooded to other node by the anti-flooding unit 49 in response to the situation information on the network.

To this end, the situation information comparing unit 45 may compare at least one situation information associated with the anti-flagged message among the messages stored in the message storage unit 10 with a preset threshold for each situation information. The situation information may include a hop count, a Time-To-Live (TTL) and the number of requester nodes of the corresponding message and a mobility pattern of the node.

The situation information comparing unit 45 may compare the hop count of the anti-flagged message among the messages stored in the message storage unit 10 with a preset hop count threshold.

When copying a message in a network environment, the number of hops of the corresponding message may be counted. That is, the hop count of the message may represent the measure of corresponding messages that are spread over the network. Accordingly, the present disclosure may recognize the number of copies of the message in the network based on the hop count of the corresponding message, and in order to not only contribute to the efficient message delivery in DTN environment but also avoid congestion caused by generation of too many duplicate messages, may control flooding of the message according to the hop count of the corresponding message.

Here, the hop count threshold may be divided into an urgent message hop count threshold $HU_{th}$ or a normal message hop count threshold $HN_{th}$. In general, a message may be classified into an urgent message and a normal message according to its necessity. Each of the urgent message hop count threshold $HU_{th}$ and the normal message hop count threshold $HN_{th}$ is the threshold for restricting the copying of the urgent message and the normal message, and the urgent message hop count threshold $HU_{th}$ may be set to be larger than the normal message hop count threshold $HN_{th}$ so that copying of the urgent message is allowed larger than the normal message.

Accordingly, the situation information comparing unit 45 may classify the anti-flagged message among the messages stored in the message storage unit 10 as an urgent message or a normal message. The situation information comparing unit 45 may compare the hop count HU of the message classified as an urgent message with the urgent message hop count threshold $HU_{th}$, and the hop count HN of the message classified as a normal message with the normal message hop count threshold $HN_{th}$.

As a result of comparing the hop count of the anti-flagged message among the messages stored in the message storage unit 10 by the situation information comparing unit 45, when the hop count of the anti-flagged message is equal to or more than the urgent message hop count threshold $HU_{th}$ or the normal message hop count threshold $HN_{th}$, it may be regarded that a sufficient number of copies of the corresponding message spread over the network, and thus flooding of the corresponding message may be controlled by the anti-flooding unit 49 to suppress the copying. Its detailed description is provided below.

In contrast, as a result of comparing the hop count of the anti-flagged message among the messages stored in the message storage unit 10 by the situation information comparing unit 45, when the hop count of the anti-flagged message is less than the urgent message hop count threshold $HU_{th}$ or the normal message hop count threshold $HN_{th}$, flooding may be controlled by the normal flooding unit 47 to increase the message delivery ratio in DTN.

Additionally, the situation information comparing unit 45 may compare the TTL of the anti-flagged message among the messages stored in the message storage unit 10 with a preset TTL threshold.

When messages are randomly distributed in DTN environment, the message delivery performance may reduce due to inefficient use of the limited storage space of nodes. Accordingly, the present disclosure prevents the unnecessary long-term circulation of the message by using the TTL of the message, and through this, efficiently stores and manages the message in the storage space of nodes, thereby contributing to the improved network performance.

For example, when the TTL of the message is relatively large, it may be regarded that the possibility of the corresponding message being deleted due to the expired TTL is low, and there is enough time left to arrive at the destination node. On the contrary, when there is not enough TTL of the message left, it may be considered that the possibility of arriving at the destination node during the remaining time is low, and in this case, it is desirable to reduce the copying of the corresponding message in the network.

Accordingly, the situation information comparing unit 45 may compare the TTL of the anti-flagged message among the messages stored in the message storage unit 10 with the preset TTL threshold $TL_{th}$. Here, the TTL threshold $TL_{th}$ may be set with a sufficient time for the message to arrive at the destination node.

As a result of comparing the TTL of the anti-flagged message among the messages stored in the message storage unit 10 by the situation information comparing unit 45, when the TTL of the anti-flagged message is less than the TTL threshold $TL_{th}$, it may be regarded that the possibility of the corresponding message arriving at the destination node during the remaining time is low, and thus flooding of the corresponding message may be controlled by the anti-flooding unit 49 to suppress the copying. Its detailed description is provided below.

In contrast, as a result of comparing the TTL of the anti-flagged message among the messages stored in the message storage unit 10 by the situation information comparing unit 45, when the TTL of the anti-flagged message is equal to or greater than the TTL threshold $TL_{th}$, flooding may be controlled by the normal flooding unit 47 to increase the message delivery ratio in DTN.

Additionally, the situation information comparing unit 45 may compare the number of requester nodes of the anti-flagged message among the messages stored in the message storage unit 10 with a preset threshold of requester node number.

In DTN environment, delivery of a message having multiple requester nodes with priority over a message having a single requester node is advantageous for improvement of overall network message delivery ratio and overhead ratio performance.

Accordingly, the situation information comparing unit 45 may compare the number of requester nodes of the anti-flagged message among the messages stored in the message storage unit 10 with the preset requester node number threshold $NR_{th}$.

As a result of comparing the number of requester nodes of the anti-flagged message among the messages stored in the message storage unit 10 by the situation information comparing unit when the number of requester nodes of the anti-flagged message is less than the requester node number threshold $NR_{th}$, it may be regarded that the priority of the corresponding message delivery is low, and thus flooding of the corresponding message may be controlled by the anti-flooding unit 49 to suppress the copying. Its detailed description is provided below.

In contrast, as a result of comparing the number of requester nodes of the anti-flagged message among the messages stored in the message storage unit 10 by the situation information comparing unit 45, when the number of requester nodes of the anti-flagged message is equal to or greater an the requester node number threshold $NR_{th}$, it may be regarded that the priority of the corresponding message delivery in DTN is high, and flooding may be controlled by the normal flooding unit 47 to increase the message delivery ratio.

Additionally, the situation information comparing unit 45 may identify the mobility of the node and classify the node as a special node that moves in a predefined path or a random node that moves in a random path.

In DTN environment, general relay nodes can randomly move, but nodes that move in predefined paths like BUS and Tram also exist. In the case of a random node that moves in a random path, it is desirable to have a wide range of message diffusion to increase the possibility of a message arriving at the destination node. In contrast, in the case of a special node that moves in a predefined path, copying of the message may be duplicated in the t path of the corresponding node.

Accordingly, when the node in which the anti-flagged message is stored is classified as a special node by the situation information comparing unit 45, flooding of the corresponding message may be controlled by the anti-flooding unit 49 to suppress the copying. Its detailed description is provided below.

In contrast, when the node in which the anti-flagged message is stored is classified as a random node by the situation information comparing unit 45, flooding may be controlled by the normal flooding unit 47 to broaden the diffusion range of the corresponding message.

The normal flooding unit 47 may deliver the message stored in the message storage unit 10 to other node according to normal flooding protocol in DTN. For example, when Epidemic protocol is applied, the normal flooding unit 47 may deliver the stored message to all contacting nodes on the network.

The anti-flooding unit 49 may control flooding of the message stored in the message storage unit 10 to other node according to the immunity scheme applied in DTN, i.e., anti-flooding mechanism, for example, one of IMMUNE, IMMUNE_TX, VACCINE and Improved discarding mechanisms. Its description is made with reference to FIGS. 5 to 8.

Figure 6:
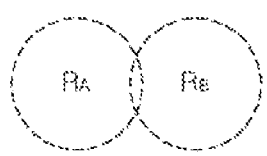
FIG. 6 is a diagram illustrating message very when IMMUNE_TX scheme is applied to an anti-flooding unit shown in FIG. 4.
Figure 7:
FIG. 7 is a diagram illustrating message delivery when VACCINE scheme is applied to an anti-flooding unit shown in FIG. 4.

FIG. 5 is a diagram illustrating message delivery when IMMUNE scheme is applied to the anti-flooding unit shown in FIG. 4, FIG. 6 is a diagram illustrating message delivery when IMMUNE_TX scheme is applied to the anti-flooding unit shown in FIG. 4, FIG. 7 is a diagram illustrating message delivery when VACCINE scheme is applied to the anti-flooding unit shown in FIG. 4, and FIG. 8 is a diagram illustrating message delivery when Improved discarding scheme is applied to anti-flooding unit shown in FIG. 4.

Hereinafter, the congestion control device 1000 according to the embodiment of the present disclosure shown in FIG. 1 is equipped in the first node $R_A$ and the second node $R_B$ shown in FIGS. 5 to 8, and message flooding from the first node $R_A$ to the second node $R_B$, for example, will be described.

First, referring to FIG. 5, the first node $R_A$ may store a message list or a list of Interest packets including data and its requester node information by the message storage unit 10. Additionally, the first node $R_A$ may store a PAID table having items of its requester node Req, immunity Anti for data and requester node SC having received data for each data of the message stored in the message storage unit 10 by the PAID table storage unit 20. In the message list of the first node $R_A$, i_1, i_2 and i_6 are identified to be an anti-flagged message by the PAID table.

When the first node $R_A$ contacts the second node $R_B$, each node may exchange the message list. The first node $R_A$ may attempt to flood all messages in the message list to the second node $R_B$, and non-anti-flagged i_4 and i_8 may be flooded to the second node $R_B$ by the normal flooding unit 47. Accordingly, the requester node $C_3$ information of i_8 may be additionally stored in interest packet i_9 for Data d_5 in the message list of the second node $R_B$.

Additionally, in the case of anti-flagged i_2 and i_6, flooding from the first node $R_A$ to the second node $R_B$ may be controlled by the anti-flooding unit 49 according to situation information. Specifically, when IMMUNE scheme is applied to the anti-flooding unit 49, flooding of i_1, i_2 and i_6 to the second node $R_B$ may be restricted. That is, the anti-flooding unit 49 may suppress the copying of i_1, i_2 and i_6 to the second node $R_B$. Accordingly, i_1 is Interest packet for Data d_1, but the requester node $C_1$ information included in i_1 is not copied to Interest packet i_3 for Data d_1 in the message list of the second node $R_B$.

Referring to FIG. 6, when IMMUNE_TX scheme is applied to the anti-flooding unit 49, similar to IMMUNE scheme, flooding of i_1, i_2 and i_6 to the second node $R_B$ may be restricted.

In addition to this, when IMMUNE_TX scheme is applied to the anti-flooding unit 49, a duplicate message may be deleted from the message list of the second node $R_B$. For example, because i_1 of the first node $R_A$ is Interest packet of the requester node $C_2$ for Data d_1, Interest packet i_3 of the requester node $C_2$ for Data d_1 in the message list of the second node $R_B$ may be deleted. Likewise, because i_6 of the first node $R_A$ is interest packet of the requester node $C_5$ for Data d_4, Interest packet i_7 of the requester node $C_5$ for Data d_4 in the message list of the second node $R_B$ may be deleted.

Additionally, when IMMUNE_TX scheme is applied to the anti-flooding unit 49, the PAID table of the second node $R_B$ may be updated. For example, i_6 of the first node $R_A$ is Interest packet of the requester node $C_5$ for Data d_4, and is a duplicated message of i_7 in the message list of the second node $R_B$. According to the PAID table of the first node $R_A$, anti-flay is present in the corresponding message, while according to the PAID table of the second node $R_B$, anti-flag is absent in the corresponding message. In this case, the anti-flooding unit 49 may update the PAID table of the second node $R_B$ by assigning the anti-flag to the Data d_4 item in the PAID table of the second node $R_B$.

Referring to FIG. 7, when VACCINE scheme is applied to the anti-flooding unit 49, similar to IMMUNE scheme or IMMUNE_TX scheme, flooding of i_1, i_2 and i_6 to the second node $R_B$ may be restricted.

Additionally, when VACCINE scheme is applied to the anti-flooding unit 49, similar to IMMUNE_TX scheme, a duplicate message may be deleted from the message list of the second node $R_B$ and the PAID table of the second node $R_B$ may be updated by assigning the anti-flag to the corresponding message in the PAM table of the second node $R_B$.

In addition to this, when VACCINE scheme is applied to the anti-flooding unit 49, the PAID table of the second node $R_B$ may be updated by adding information associated with the message of the first node $R_A$ to the PAID table of the second node $R_B$. For example, i_1 of the first node $R_A$ is Interest packet of the requester node $C_1$, $C_2$ for Data d_1, and according to the PAID table of the second node $R_B$, the requester node $C_1$ does not exist in the requester node Req item for Data d_1. In this case, the anti-flooding unit 49 may update the PAID table of the second node $R_B$ by allocating requester node information based on the data list of the first node $R_A$ to the requester node Req item for Data d_1 in the PAID table of the second node $R_B$. Additionally, i_2 of the first node $R_A$ is the Interest packet of the requester node $C_3$ for Data d_2, and according to the PAID table of the second node $R_B$, there is no item for Data d_2. In this case, the anti-flooding unit 49 may update the PAID table of the second node $R_B$ by adding information of i_2 to the PAID table of the second node $R_B$.

Referring to FIG. 8, when Improved discarding scheme is applied to the anti-flooding unit 49, similar to IMMUNE scheme, IMMUNE_TX scheme or VACCINE scheme, flooding of i_1, i_2 and i_6 to the second node $R_B$ may be restricted.

When Improved discarding scheme is applied e anti-flooding unit 49, similar to IMMUNE_TX scheme or VACCINE scheme, a duplicate message may be deleted from the message list of the second node $R_B$, and the PAID table of the second node $R_B$ may be updated by assigning an anti-flag to the corresponding message in the PAID table of the second node $R_B$.

When Improved discarding scheme is applied to the anti-flooding unit 49, similar to VACCINE scheme, the PAID table of the second node $R_B$ may be updated by adding information associated with the message of the first node $R_A$ to the PAID table of the second node $R_B$. For example, i_1 of the first node $R_A$ is the Interest packet of the requester node $C_1$, $C_2$ for Data d_1, and according to the PAID table of the second node $R_B$, the requester node $C_1$ does not exist in the requester node Req item for Data d_1. In this case, the anti-flooding unit 49 may update the PAID table of the second node $R_B$ by allocating requester node information based on the data list of the first node $R_A$ to the requester node Req item for Data d_1 in the PAID table of the second node $R_B$. Additionally, i_2 of the first node $R_A$ is Interest packet of the requester node $C_3$ for Data d_2, and according to the PAID table of the second node $R_B$, there is no item for Data d_2. In this case, the anti-flooding unit 49 may update the PAID table of the second node $R_B$ by adding information of i_2 to the PAID table of the second node $R_B$.

In addition to this, when the Improved discarding scheme is applied to the anti-flooding unit 49, the PAID table may be updated by comparing the requester node SC the item that received data for duplicate data in the PAID table of the first node $R_A$ and the PAID table of the second node $R_B$. For example, the requester node $C_3$ included in the message is indicated in the requester node SC item having received data for Data d_2 in the PAID table of the first node $R_A$. In this case, the PAID table may be updated by additionally indicating the requester node $C_3$ in the requester node SC item having received data for Data d_2 in the PAM table of the second node $R_B$.

However, when the improved discarding scheme is applied to the anti-flooding unit 49, the corresponding message may be deleted from the message list after identifying the requester node SC item that received data for the corresponding message in the PAID table. For example, i_2 of the first node $R_A$ is Interest packet of requester node ($C_3$) for Data d_2, and according to the PAID table of the first node $R_A$, the requester node $C_3$ included in the message is indicated in the requester node SC item that received data for Data d_2. In this case, the anti-flooding unit 49 may delete i_2 from the message list.

As described above, the anti-flooding unit 49 may restrict the copying of the anti-flagged message to other nodes by applying one of IMMUNE scheme, IMMUNE_TX scheme, VACCINE scheme and Improved discarding scheme. Alternatively, the anti-flooding unit 49 may update the message list of other nodes by deleting a duplicated message of the anti-flagged message from the message list of other nodes. Alternatively, the anti-flooding unit 49 may update the message list of other nodes by adding information associated with the anti-flagged message to the PAID table of other nodes. Accordingly, duplicate message delivery by other node can be suppressed in the future, and thus network overhead can be controlled, and the performance in aspect of overhead ratio in DTN environment can be improved.

Hereinafter, a congestion control method in information centric network environment with delay tolerant networking according to the embodiment of the present disclosure will be described.

The congestion control method according to the embodiment of the present disclosure may be equipped in each node in a network environment to control message flooding between nodes in response to situation information.

The congestion control method according to the embodiment of the present disclosure may be performed in substantially the same configuration as the congestion control device 1000 of FIG. 1. Accordingly, the first node $R_A$ and the second node $R_B$ have the congestion control device 1000 shown in FIG. 1, and when the first node $R_A$ contacts the second node $R_B$, the control of message flooding from the first node $R_A$ to the second node $R_B$ will be described.

FIGS. 9 to 12 are flowcharts of a congestion control method according to the embodiment of the present disclosure.

Figure 9:
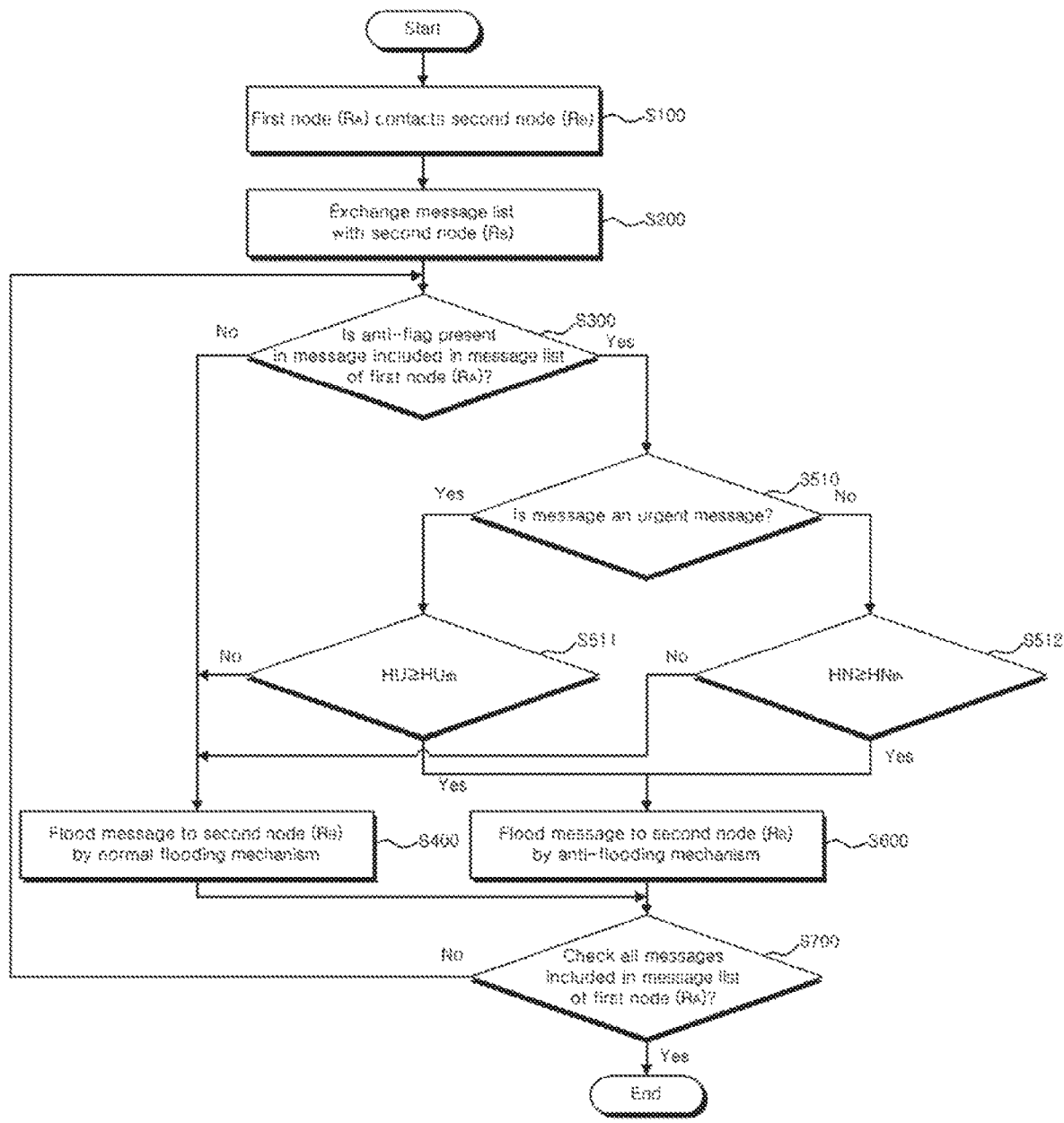
FIGS. 9 to 12 are flowcharts of a congestion control method according to the embodiment of the present disclosure.

Referring to FIG. 9, when the first node $R_A$ contacts the second node $R_B$ (S100), the first node $R_A$ may exchange a message list with the second node $R_B$ (S200). For example, the message list a be a list of Interest packets including data and its requester node information, and may include Interest identification (ID) number, data and its requester node.

The first node $R_A$ may identity whether the anti-flag is stored in each message of the message list (S300).

The first node $R_A$ may identify the presence or absence of anti-flag for each message of the message list using a PAID table. The PAID table is a table having items of requester node Req, immunity Anti for data and requester node SC having received data for each data of the message stored in the first node $R_A$, and when the first node $R_A$ arrives at the destination node that provides the data of the message, anti-flag may be assigned to the immunity Anti item of the corresponding data, and when the first node $R_A$ delivers the data of the message to the requester node, the requester node may be recorded in the requester node SC item having received data of the corresponding data. The first node $R_A$ may identify if anti-flag is allocated to the immunity Anti item for the data of the message in the PAID table.

The first node $R_A$ may flood a non-anti-flagged message to the second node $R_B$ by normal flooding mechanism (S400).

The first node $R_A$ may deliver a non-anti-flagged message to other node according to normal flooding protocol in DTN. For example, normal flooding mechanism may be Epidemic protocol whereby the stored message is delivered to all contacting nodes in the network.

In an anti-flagged message, the first node $R_A$ may determine flooding mechanism of the corresponding message fey comparing at least one situation information of the corresponding message with a preset threshold for each situation information. Here, the situation information may include a hop count, a Time-To-Live (TTL) and the number of requester nodes of the corresponding message and a mobility pattern of the first node $R_A$.

FIG. 9 is a flowchart showing, for example, in an anti-flagged message, the first node $R_A$ determines flooding mechanism of the corresponding message by comparing situation information of the hop count of the corresponding message with the threshold.

The first node $R_A$ may classify the anti-flagged message as an urgent message or a normal message (S510).

For example, the first node $R_A$ may classify the message as either an urgent message or a normal message according to the necessity of the message.

When the anti-flagged message is classified as an urgent message (S510), the first node $R_A$ may compare the hop count HU of the corresponding message with the urgent message hop count threshold $HU_{th}$ (S511), and when the anti-flagged message is classified as a normal message (S510), the first node $R_A$ may compare the hop count HN of the corresponding message with the normal message hop count threshold $HN_{th}$ (S512).

Here, the hop count threshold may be divided into the gent message hop count threshold $HU_{th}$ and the normal message hop count $HN_{th}$. In general, a message may be classified into an urgent message and a normal message according to its necessity. Each of the urgent message hop count threshold $HU_{th}$ and the normal message hop count threshold $HN_{th}$ is the threshold for restricting the copying of the urgent message and the normal message, and the urgent message hop count threshold $HU_{th}$ may be set to be larger than the normal message hop count threshold $HN_{th}$ so that copying of the urgent message is allowed more than the normal message.

When the hop count HU of the message classified as an urgent message is less than the urgent message hop count threshold $HU_{th}$ (S511), or the hop count HN of the message classified as a normal message is less than the normal message hop count threshold $HN_{th}$ (S512), the first node $R_A$ may flood the corresponding message to the second node $R_B$ by normal flooding mechanism (S400). In this case, the delivery ratio of the corresponding message in DTN can be increased.

When the hop count HU of the message classified as an urgent message is equal to or greater than the urgent message hop count threshold. $HU_{th}$ (S511), or the hop count HN of the message classified as a normal message is equal to or greater the normal message hop count threshold $HN_{th}$ (S512), the first node $R_A$ may flood the corresponding message to the second node $R_B$ by anti-flooding mechanism (S600).

For the anti-flooding mechanism, one of IMMUNE scheme, IMMUNE_TX scheme, VACCINE scheme and Improved discarding scheme may be applied. For example, the first node $R_A$ may restrict the copying of the anti-flagged message to the second node $R_B$. Alternatively, the first node $R_A$ may update the message list of the second node $R_B$ by deleting a duplicated message of the anti-flagged message from the message list of the second node $R_B$. Alternatively, the first node $R_A$ may update the message list of the second node $R_B$ by adding information associated with the anti-flagged message to the PAID table of the second node $R_B$. In this case, duplicate message delivery by the second node $R_B$ can be suppressed in the future, and thus network overhead can be controlled, and the performance in terms of the overhead ratio in the DTN environment can be improved.

The first node $R_A$ may repeat the above-described steps for all messages included in the message list (S700) to control the flooding to the second node $R_B$.

Figure 10:
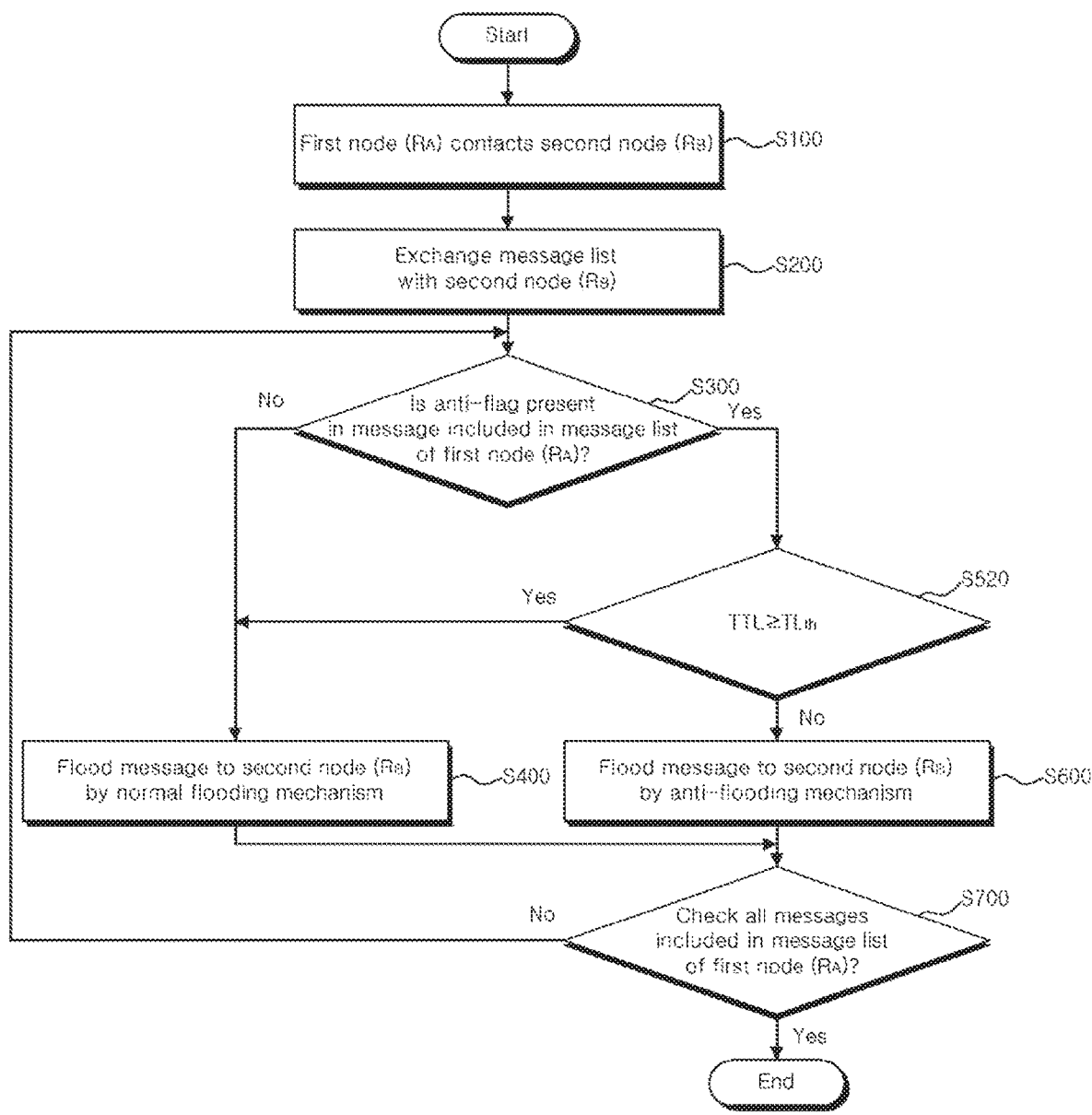

FIG. 10 is a flowchart showing, for example, in an anti-flagged message, the first node $R_A$ compares situation information of the TTL of the corresponding message with the threshold and determines flooding mechanism of the corresponding message.

Referring to FIG. 10, the first node $R_A$ may compare the TTL of the anti-flagged message with the preset TTL threshold $TL_{th}$ (S520).

Here, the TTL threshold $TL_{th}$ may be set to a sufficient time for the message to arrive at the destination node.

When the TTL of the anti-flagged message is equal to or greater than the TTL threshold $TL_{th}$ (S520), the first node $R_A$ may flood the corresponding message to the second node $R_B$ by normal flooding mechanism (S400). In this case, the delivery ratio of the corresponding message in DTN can be increased.

When the TTL of the anti-flagged message is less than the TTL threshold $TL_{th}$ (S520), the first node $R_A$ may flood the corresponding message to the second node $R_B$ by anti-flooding mechanism (S600).

The first node $R_A$ may repeat the above-described steps for all messages included in the message list (S700) to control flooding to the second node $R_B$.

Figure 11:
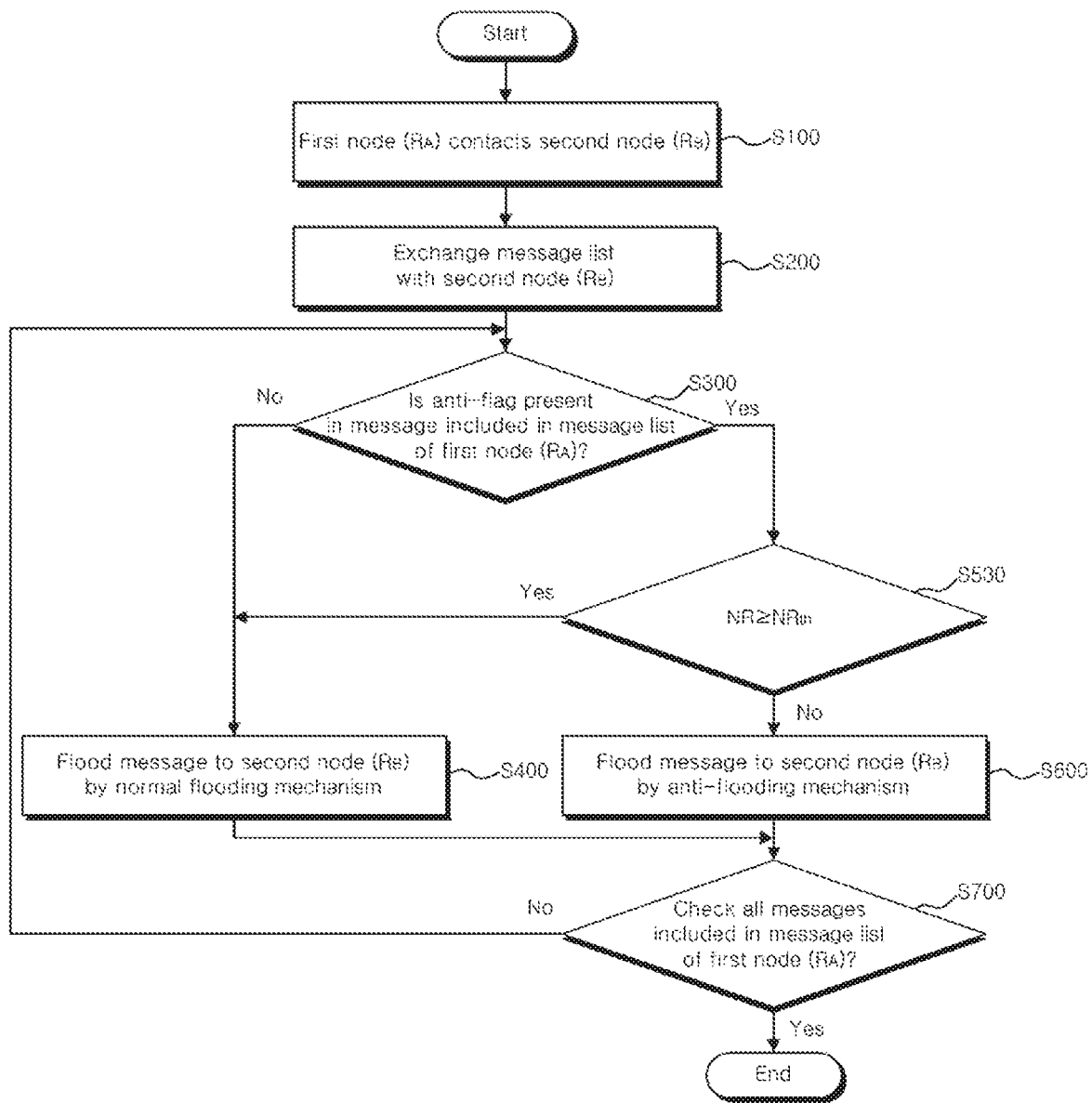

FIG. 11 is a flowchart showing, for example, in an anti-flagged message, the first node $R_A$ compares situation information of the number of requester nodes of the corresponding message with the threshold.

Referring to FIG. 11, the first node $R_A$ may compare the number of requester nodes NR of the anti-flagged message with the preset requester node number threshold $NR_{th}$ (S530).

In DTN environment, delivery of a message having multiple requester nodes with priority over a message having a single requester node is advantageous for improvement of overall network message delivery ratio and overhead ratio performance, and considering this, the requester node number threshold $NR_{th}$ may be set.

When the number of requester nodes NR of the anti-flagged message is equal to or greater than the preset requester node number threshold $NR_{th}$ (S530), the first node $R_A$ may flood the corresponding message to the second node $R_B$ by normal flooding mechanism (S400). In this case, the delivery ratio of the corresponding message in DTN can be increased.

When the number of requester nodes NR of the anti-flagged message is less than the preset requester node number threshold $NR_{th}$ (S530), the first node $R_A$ may flood the corresponding message to the second node $R_B$ by anti-flooding mechanism (S600).

The first node $R_A$ may repeat the above steps for all messages included in the message list (S700) to control flooding to the second node $R_B$.

Figure 12:
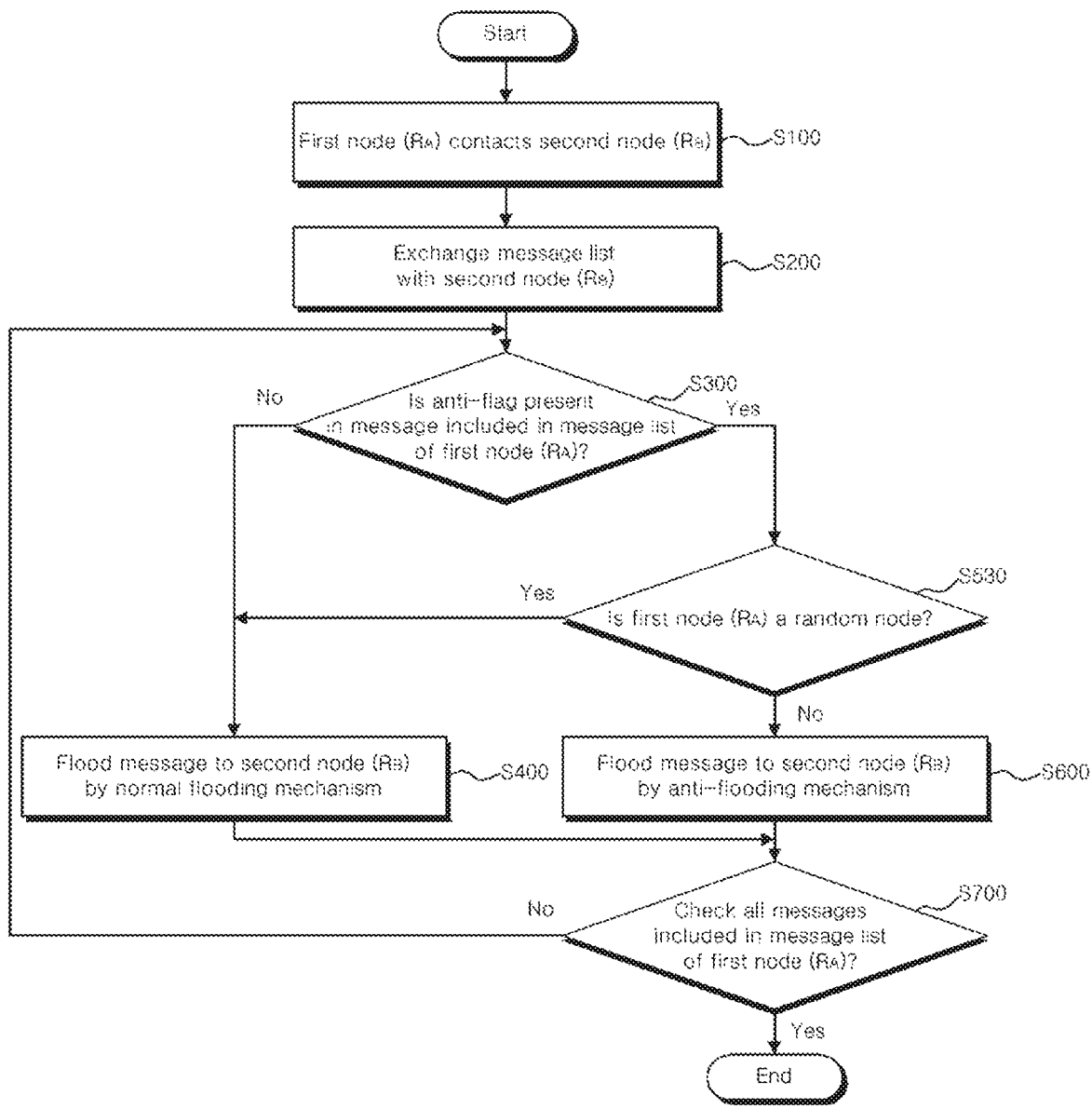

FIG. 12 is a flowchart showing, for example, in an anti-flagged message, the first node $R_A$ determines flooding mechanism of the corresponding message in response to situation information of the mobility pattern of the first node $R_A$.

Referring to FIG. 12, the first node $R_A$ may identify mobility of the first node $R_A$, and classify as a special node that moves in a predefined path or a random node that moves in a random path (S540).

In DTN environment, general relay nodes can randomly move, but nodes that move in a predefined path like BUS and Tram also exist. In the case of a random node that moves in a random path, it is desirable to have a wide range of message diffusion to increase the possibility of the message arriving at the destination node. In contrast, in the case of a special node that moves in a predefined path, copying of the message may be duplicated in the movement path of the corresponding node.

When the first node $R_A$ is classified as a random node (S540), the first node $R_A$ may flood the anti-flagged message to the second node $R_B$ by the normal flooding mechanism (S400). In this case, the diffusion range of the corresponding message in DTN may be broadened.

When the first node $R_A$ is classified as a special node (S540), the first node $R_A$ may flood the anti-flagged message to the second node $R_B$ by anti-flooding mechanism (S600).

The first node $R_A$ may repeat the above steps for all messages included in the message list (S700) to control flooding to the second node $R_B$.

As described above, according to the congestion control method in accordance with the embodiment of the present disclosure, in the anti-flagged message, the first node $R_A$ may compare at least one of situation information including the hop count, the TTL and the number of requester nodes of the corresponding message and the mobility pattern of the first node $R_A$ with the preset threshold condition for each situation information, and flood the corresponding message to the second node $R_B$ by normal flooding mechanism or anti-flooding mechanism according to the results.

Accordingly, the congestion control method according to the embodiment of the present disclosure controls flooding of the message according to the number of copies of the corresponding message in the network based on the hop count of the corresponding message, thereby not only contributing to the efficient message delivery in DTN environment but also avoiding congestion caused by generation of too many duplicate messages. It is possible to prevent the unnecessary long-term circulation of the message by using the TTL of the message, and through this, efficiently store and manage the message in the storage space of nodes, thereby contributing to the unproved network performance. It is possible to improve the overall network message delivery ratio and the overhead ratio performance by delivering a message having multiple requester nodes with priority over a message having a single requester node using the number of requester nodes of the message.

Figure 13:
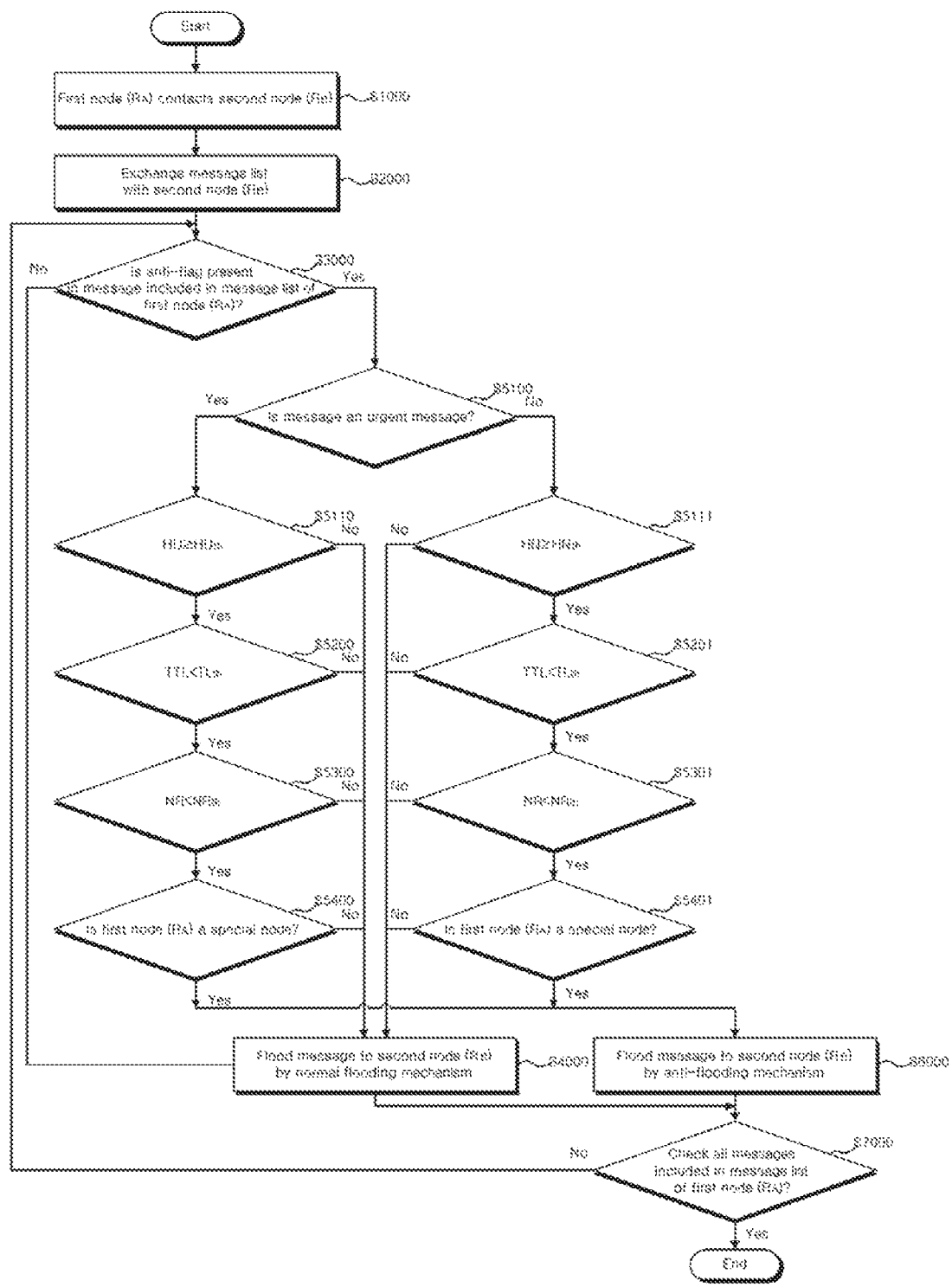
FIG. 13 is a flowchart of a congestion control method according to another embodiment of the present disclosure.

FIG. 13 is a flowchart of a congestion control method according to another embodiment of the present disclosure.

The congestion control method according to another embodiment of the present disclosure may be equipped in each node in a network environment to control message flooding between nodes in response to the situation information.

The congestion control method according to another embodiment of the present disclosure may be performed in substantially the same configuration as the congestion control device 1000 of FIG. 1. Accordingly, the first node $R_A$ and the second node $R_B$ have the congestion control device 1000 shown in FIG. 1, and when the first node $R_A$ contacts the second node $R_B$, the control of message flooding from the first node $R_A$ to the second node $R_B$ will be described.

When compared to the congestion control method according to an embodiment of the present disclosure as shown in FIGS. 9 to 12, the congestion control method according to another embodiment of the present disclosure is only different in that all situation information including the hop count, the TTL and the number of requester nodes of the anti-flagged message and the mobility pattern of the first node $R_A$ are taken into account to determine flooding mechanism of the corresponding message, and the other steps are the same, and thus overlapping descriptions are omitted herein.

Referring to FIG. 13, when the first node $R_A$ contacts the second node $R_B$ (S1000), the first node $R_A$ may exchange a message list with the second node $R_B$ (S2000).

The first node $R_A$ may identify whether the anti-flag is stored each message of the message list (S3000).

The first node $R_A$ may flood a non-anti-flagged message to the second node $R_B$ by normal flooding mechanism (S4000).

The first node $R_A$ may classify an anti-flagged message as an urgent message or a normal message (S5100).

In case that the anti-flagged message is classified as an urgent message (S5100), when the hop count HU of the corresponding message is less than the urgent message hop count threshold $HU_{th}$ (S5110), or the TTL of the corresponding message is equal to or greater than the TIT threshold $TL_{th}$ (S5200), or the number of requester nodes NR of the corresponding message is equal to or more than the preset requester node number threshold $NR_{th}$ (S5300), or after identifying mobility of the first node $R_A$, when the first node $R_A$ is classified as a random node that moves in a random path (S5400), the first node $R_A$ may flood the corresponding message to the second node $R_B$ by normal flooding mechanism (S4000).

In contrast, in case that the anti-flagged message is classified as an urgent message (S5100), when the hop count HU of the corresponding message is equal to or greater than the urgent message hop count threshold $HU_{th}$ (S5110), the TTL of the corresponding message is less than the TTL threshold $TL_{th}$ (S5200), the number of requester nodes NR of the corresponding message is less than the preset requester node number threshold $NR_{th}$ (S5300), and after identifying mobility of the first node $R_A$, the first node $R_A$ is classified as a special node that moves in a predefined path (S5400), the first node $R_A$ may flood the corresponding message to the second node $R_B$ by anti-flooding mechanism (S6000).

Additionally, in case that the anti-flagged message is classified as a normal message (S5100), when the hop count HN of the corresponding message is less than the normal message hop count threshold $HN_{th}$ (S5111), or the TTL of the corresponding message is equal to or more than the TTL threshold $TL_{th}$ (S5201), or the number of requester nodes NR of the corresponding message is equal to or more than the preset requester node number threshold $NR_{th}$ (S5301), or after identifying mobility of the first node $R_A$, when the first node $R_A$ is classified as a random node that moves in a random path S (5401), the first node $R_A$ may flood the corresponding message to the second node $R_B$ by the normal flooding mechanism (S4000).

In contrast, in case that the anti-flagged message is classified as a normal message (S5100), when the hop count HN of the corresponding message is equal to or more than the normal message hop count threshold $HN_{th}$ (S5111), the TTL of the corresponding message is less than the TTL threshold $TL_{th}$ (S5201), the number of requester nodes NR of the corresponding message is less than the preset requester node number threshold $NR_{th}$ (S5301), and after identifying mobility of the first node $R_A$, when the first node $R_A$ is classified as a special node that moves in a predefined path (S5401), the first node $R_A$ may flood the corresponding message to the second node $R_B$ by anti-flooding mechanism (S6000).

The first node $R_A$ may repeat the above steps for all messages included in the message list (S7000) to control flooding to the second node $R_B$.

As described above, according to the congestion control method in accordance with another embodiment of the present disclosure, in the anti-flagged message, the first node $R_A$ may compare situation information including the hop count, the TTL and the number of requester nodes of the corresponding message and the mobility pattern of the first node $R_A$ with the preset threshold conditions respectively, and flood the corresponding message to the second node $R_B$ by the normal flooding mechanism or anti-flooding mechanism according to the results.

Accordingly, the congestion control method according to another embodiment of the present disclosure controls flooding of the message according to the number of copies of the corresponding message in the network based on the hop count of the corresponding message, thereby not only contributing to the efficient message delivery in DTN environment but also avoiding congestion caused by generation of too many duplicate messages. Additionally, it is possible to prevent unnecessary long-term circulation of the message by using the TTL of the message, and through this, efficiently store and manage the message in the storage space of nodes, thereby contributing to the improved network performance. Additionally, it is possible to improve the overall network message delivery ratio and the overhead ratio performance by delivering a message having multiple requester nodes with priority over a message having a single requester node using the number of requester nodes of the message.

The above-described congestion control method in information centric network environment with delay tolerant networking may be implemented as an application or in the form of program commands that are executed through various computer components, and recorded in computer-readable recording media. The computer-readable recording media may include program commands, data files and data structures, alone or in combination.

The program commands in recorded in the computer-readable recording media may be specially designed and configured for the present disclosure and may be known and available to those having ordinary skill in the field of computer software.

Examples of the computer-readable recording media include hardware devices specially designed to store and execute program commands, such as magnetic media such as hard disk, floppy disk and magnetic tape, optical recording media such as CD-ROM and DVD, magneto-optical media such as floptical disk, and ROM, RAM and flash memory.

Examples of the program commands include machine codes generated by a compiler as well as high-level language codes that can be executed by a computer using an interpreter. The hardware device may be configured to act as one or more software modules to perform processing according to the present disclosure, or vice versa.

While the present disclosure has been hereinabove described with reference to the embodiments, it will be apparent to those skilled in the corresponding technical field that a variety of modifications and changes may be made thereto without departing from the spirit and scope of the present disclosure set forth in the appended claims.

DETAILED DESCRIPTION OF MAIN ELEMENTS

1000: Congestion control device
10: Message storage unit
20: PAID table storage unit
40: Message flooding unit

What is claimed is:

1. A congestion control method for controlling message flooding between nodes in reply to situation information of an information centric network environment with delay tolerant networking, the congestion control method comprising:
when a first node contacts a second node, exchanging information with the second node;
identifying whether anti-flag is stored in messages in the first node, wherein the anti-flag is assigned when each message arrives at a destination node;
first flooding the messages in the first node which do not include the anti-flag to the second node; and
second flooding the messages in the first node which include the anti-flag to the second node according to at least one of the following situation information including: a hop count, a Time-To-Live (TTL), a number of requester nodes of the corresponding message, and a mobility pattern of the first node, or restricting the second flooding to the second node,
wherein the step of the identifying comprises:
identifying whether the anti-flag is stored in messages in the first node by using a Pending Anti Interest and Data (PAID) table having items of requester node, immunity, and requester node having received data for each data of each message stored in the first node;
storing the PAID table having items of requester node, immunity, and requester node having received data for data of each message stored in the first node;
upon arrival at the destination node that provides data of the messages stored in the first node, allocating anti-flag to an immunity item of the corresponding data in the PAID table; and
after delivery of data of the messages stored in the first node to a requester node of the corresponding data, recording the requester node in the requester node item having received data of the corresponding data in the PAID table.

2. A computer-readable non-transitory recording medium having recorded thereon a computer program for performing the congestion control method of claim 1.

3. A congestion control method for controlling message flooding between nodes in reply to situation information of an information centric network environment with delay tolerant networking, the congestion control method comprising:

when a first node contacts a second node, exchanging information with the second node;

identifying whether anti-flag is stored in messages in the first node, wherein the anti-flag is assigned when each message arrives at a destination node;

first flooding the messages in the first node which do not include the anti-flag to the second node; and second flooding the messages in the first node which include the anti-flag to the second node according to at least one of the following situation information including: a hop count, a Time-To-Live (TTL), a number of requester nodes of the corresponding message, and a mobility pattern of the first node, or restricting the second flooding to the second node, wherein the step of the second flooding comprises:

in the case of controlling the second flooding of the anti-flagged message among the messages stored in the first node to the second node according to the hop count of the corresponding message, classifying the corresponding message as an urgent message or a normal message;

comparing the hop count of the anti-flagged message among the messages stored in the first node with a preset urgent message hop count threshold $HU_{th}$ or normal message hop count threshold $HN_{th}$;

when the hop count of the anti-flagged message among the messages stored in the first node is less than the urgent message hop count threshold $HU_{th}$ or the normal message hop count threshold $HN_{th}$, the second flooding the corresponding message to the second node; and when the hop count of the anti-flagged message among the messages stored in the first node is equal to or greater than the urgent message hop count threshold $HU_{th}$ or the normal message hop count threshold $HN_{th}$, restricting the second flooding of the corresponding message to the second node.

4. A computer-readable non-transitory recording medium having recorded thereon a computer program for performing the congestion control method of claim 3.

5. A congestion control method for controlling message flooding between nodes in reply to situation information of an information centric network environment with delay tolerant networking, the congestion control method comprising:

when a first node contacts a second node, exchanging information with the second node;

identifying whether anti-flag is stored in messages in the first node, wherein the anti-flag is assigned when each message arrives at a destination node;

first flooding the messages in the first node which do not include the anti-flag to the second node; and second flooding the messages in the first node which include the anti-flag to the second node according to at least one of the following situation information including: a hop count, a Time-To-Live (TTL), a number of requester nodes of the corresponding message, and a mobility pattern of the first node, or restricting the second flooding to the second node, wherein the step of the second flooding comprises:

in the case of controlling the second flooding of the anti-flagged message among the messages stored in the first node to the second node according to the TTL of the corresponding message, comparing the TTL of the corresponding message with a preset TTL threshold $TL_{th}$;

when the TTL of the anti-flagged message among the messages stored in the first node is equal to or greater than the TTL threshold $TL_{th}$, flooding the corresponding message to the second node; and when the TTL of the anti-flagged message among the messages stored in the first node is less than the TTL threshold $TL_{th}$, restricting the flooding of the corresponding message to the second node.

6. A computer-readable non-transitory recording medium having recorded thereon a computer program for performing the congestion control method of claim 5.

7. A congestion control method for controlling message flooding between nodes in reply to situation information of an information centric network environment with delay tolerant networking, the congestion control method comprising:

when a first node contacts a second node, exchanging information with the second node;

identifying whether anti-flag is stored in messages in the first node, wherein the anti-flag is assigned when each message arrives at a destination node;

first flooding the messages in the first node which do not include the anti-flag to the second node; and second flooding the messages in the first node which include the anti-flag to the second node according to at least one of the following situation information including: a hop count, a Time-To-Live (TTL), a number of requester nodes of the corresponding message, and a mobility pattern of the first node, or restricting the second flooding to the second node, wherein the step of the second flooding comprises:

in the case of controlling the second flooding of the anti-flagged message among the messages stored in the first node to the second node according to the number of requester nodes of the corresponding message, comparing the number of requester nodes of the corresponding message with a preset requester node number threshold $NR_{th}$;

when the number of requester nodes of the anti-flagged message among the messages stored in the first node is equal to or greater than the requester node number threshold $NR_{th}$, flooding the corresponding message to the second node; and when the number of requester nodes of the anti-flagged message among the messages stored in the first node is less than the requester node number threshold $NR_{th}$, restricting the second flooding of the corresponding message to the second node.

8. A computer-readable non-transitory recording medium having recorded thereon a computer program for performing the congestion control method of claim 7.

9. A congestion control method for controlling message flooding between nodes in reply to situation information of an information centric network environment with delay tolerant networking, the congestion control method comprising:

when a first node contacts a second node, exchanging information with the second node;

identifying whether anti-flag is stored in messages in the first node, wherein the anti-flag is assigned when each message arrives at a destination node;

first flooding the messages in the first node which do not include the anti-flag to the second node; and second flooding the messages in the first node which include the anti-flag to the second node according to at least one of the following situation information including: a hop count, a Time-To-Live (TTL), a number of requester nodes of the corresponding message, and a mobility pattern of the first node, or restricting the second flooding to the second node, wherein the step of the second flooding comprises:

in the case of controlling the second flooding of the anti-flagged message among the messages stored in the first node to the second node according to the mobility pattern of the first node, classifying the first node as a special node that moves in a predefined path or a random node that moves in a random path;

when the first node is classified as a random node, flooding the anti-flagged message among the messages stored in the first node to the second node; and when the first node is classified as a special node, restricting the second flooding of the anti-flagged message among the messages stored in the first node to the second node.

10. A computer-readable non-transitory recording medium having recorded thereon a computer program for performing the congestion control method of claim 9.

11. A congestion control method for controlling message flooding between nodes in reply to situation information of an information centric network environment with delay tolerant networking, the congestion control method comprising:

when a first node contacts a second node, exchanging information with the second node;

identifying whether anti-flag is stored in messages in the first node, wherein the anti-flag is assigned when each message arrives at a destination node;

first flooding the messages in the first node which do not include the anti-flag to the second node;

second flooding the messages in the first node which include the anti-flag to the second node according to at least one of the following situation information including: a hop count, a Time-To-Live (TTL), a number of requester nodes of the corresponding message, and a mobility pattern of the first node, or restricting the second flooding to the second node; and in the case of restricting the second flooding of the anti-flagged message among the messages stored in the first node to the second node, updating information associated with messages stored in the second node using information of the anti-flagged message among the messages stored in the first node, and updating a PAM table of the second node having items of requester node, immunity, and requester node having received data for each data of each message stored in the second node using information of the anti-flagged message among the messages stored in the first node.

12. A computer-readable non-transitory recording medium having recorded thereon a computer program for performing the congestion control method of claim 11.

13. A congestion control device for controlling message flooding between nodes in reply to situation information of an information centric network environment with delay tolerant networking, the congestion control device comprising:

a memory and a processor;

a message storage unit which stores a message list including messages to deliver to another node and information associated with the messages;

a Pending Anti Interest and Data (PAID) table storage unit which stores a PAID table having a record of anti-flag for a message delivered to a destination node that provides data of the message among the messages stored in the message storage unit; and a message flooding unit which exchanges the message list with other node upon contact with another node, identifies the presence or absence of anti-flag of the messages included in the message list using the PAID table, floods a non-anti-flagged message among the messages included in the message list to other node, and floods an anti-flagged message among the messages included in the message list to other node according to at least one of situation information including a hop count, a Time-To-Live (TTL), and a number of requester nodes of the corresponding message and a mobility pattern of a node, or restricts the flooding to other node.

* * * * *